(12) United States Patent
Lee et al.

(10) Patent No.: US 7,787,074 B2
(45) Date of Patent: Aug. 31, 2010

(54) OPTICAL SHEET, BACKLIGHT UNIT, AND LIQUID CRYSTAL DISPLAY

(75) Inventors: Junghoon Lee, Cheongju-si (KR); Kyongrae Kim, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 12/271,356

(22) Filed: Nov. 14, 2008

(65) Prior Publication Data

US 2009/0296019 A1 Dec. 3, 2009

(30) Foreign Application Priority Data

May 28, 2008 (KR) .................. 10-2008-0049476
Nov. 3, 2008 (KR) .................. 10-2008-0108316

(51) Int. Cl.
*G02F 1/1335* (2006.01)
*G02B 5/30* (2006.01)
*F21V 9/14* (2006.01)

(52) U.S. Cl. ................. 349/62; 349/57; 349/96; 362/19; 359/487

(58) Field of Classification Search ............ 349/62, 349/61, 56, 57, 63, 67, 96, 87, 113; 362/606, 362/97.1, 97.2, 19; 359/487
See application file for complete search history.

(56) References Cited

U.S. PATENT DOCUMENTS

| | | | |
|---|---|---|---|
| 5,940,149 A * | 8/1999 | Vanderwerf | 349/5 |
| 7,349,039 B2 * | 3/2008 | Lee et al. | 349/57 |
| 7,467,886 B2 | 12/2008 | Kimura et al. | 362/606 |
| 7,528,915 B2 | 5/2009 | Choi et al. | 349/122 |
| 2004/0105157 A1 * | 6/2004 | Matsushita et al. | 359/584 |
| 2007/0047254 A1 | 3/2007 | Schardt et al. | 362/607 |
| 2007/0171324 A1 | 7/2007 | Lee et al. | 349/61 |
| 2007/0171325 A1 * | 7/2007 | Ko et al. | 349/62 |
| 2007/0177386 A1 | 8/2007 | Masaki et al. | 362/296 |
| 2007/0258030 A1 | 11/2007 | Kimura et al. | |
| 2007/0297168 A1 | 12/2007 | Chang et al. | 362/223 |
| 2009/0128737 A1 * | 5/2009 | Ouderkirk et al. | 349/64 |

(Continued)

FOREIGN PATENT DOCUMENTS

CN           1375066        10/2002

(Continued)

OTHER PUBLICATIONS

Korean Office Action dated Dec. 24, 2009 and English language translation.

(Continued)

*Primary Examiner*—Brian M Healy
(74) *Attorney, Agent, or Firm*—KED & Associates, LLP

(57) ABSTRACT

An optical sheet, a backlight unit including the optical sheet, and a liquid crystal display including the backlight unit may be provided. The optical sheet may include a reflective polarizing film, a base film on one surface of the reflective polarizing film, and a plurality of projections on the base film. The base film may include a first surface and a second surface opposite the first surface. A first thickness T1 is a distance between the first surface and the second surface and a second thickness T2 is a distance between the first surface and the second surface. The first and second thickness T1 and T2 satisfy the following equation: $0.1\ \mu m \leq |T1-T2| \leq 10\ \mu m$.

21 Claims, 12 Drawing Sheets

U.S. PATENT DOCUMENTS

2009/0296019 A1* 12/2009 Lee et al. ..................... 349/62

FOREIGN PATENT DOCUMENTS

| CN | 1961246 | 5/2007 | | |
| JP | 2001-159703 | 6/2001 | | |
| KR | 10-2006-0041444 | 5/2006 | ............... | 349/62 X |
| KR | 10-2007-0071347 | 7/2007 | ................ | 362/223 |
| WO | WO 2005/119350 | 12/2005 | ............... | 349/62 X |
| WO | WO 2006/044475 | 4/2006 | ............... | 349/62 X |
| WO | WO 2007/078965 | 7/2007 | ............... | 349/62 X |
| WO | WO 2007/129415 | 11/2007 | ............... | 349/62 X |

OTHER PUBLICATIONS

European Search report dated Sep. 2, 2009.
Korean Office Action dated Apr. 28, 2010.
Chinese Office Action dated Jun. 4, 2010.

* cited by examiner

OPTICAL SHEET, BACKLIGHT UNIT, AND LIQUID CRYSTAL DISPLAY

This application claims priority from Korean Patent Application Nos. 10-2008-0049476 filed on May 28, 2008, 10-2008-0108316 filed on Nov. 3, 2008, the subject matter of which is incorporated herein by reference.

BACKGROUND

1. Field

Embodiments of the present invention may relate to an optical sheet, a backlight unit including the optical sheet, and/or a liquid crystal display including the backlight unit.

2. Background

A display field may visually display information of various electrical signal. In the display field, various kinds of flat panel displays having excellent characteristics such as thin profile, lightness in weight, and low power consumption have been introduced. Additionally, flat panel displays are replacing cathode ray tubes (CRT).

Examples of flat panel displays include a liquid crystal display (LCD), a plasma display panel (PDP), a field emission display (FED), and an electroluminescence display (ELD). The liquid crystal display may be used as a display panel of notebooks, monitors of personal computers, and TV monitors because of a high contrast ratio and excellent display characteristics of a moving picture.

The liquid crystal display may be considered a light receiving display. The liquid crystal display may include a liquid crystal display panel that displays an image and a backlight unit that is positioned under the liquid crystal display panel to provide the liquid crystal display panel with light.

The backlight unit may include a light source and an optical sheet. The optical sheet may include a diffusion sheet, a prism, or a protective sheet. In the backlight unit, the optical sheet including a plurality of sheets may be used to diffuse and focus light produced by the light source. However, there may be limits to improvement in fabrication yield and improvement in luminance of the backlight unit.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
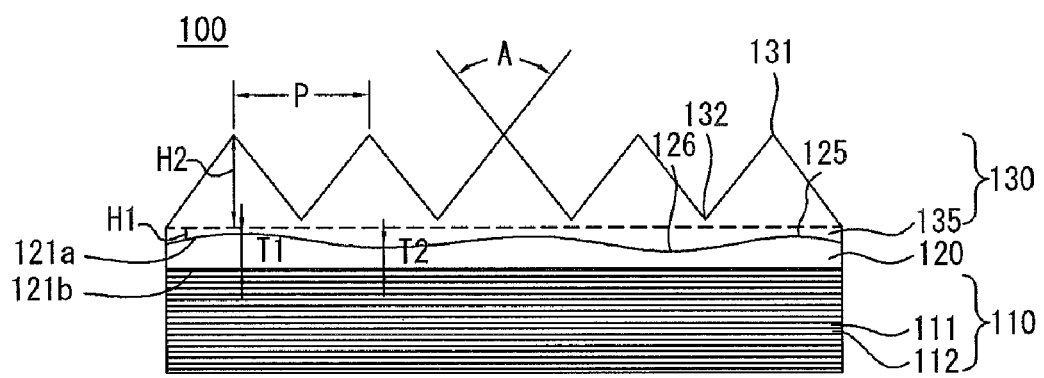
FIGS. 1 to 3 show an optical sheet according to an exemplary embodiment of the present invention.
Figure 2:
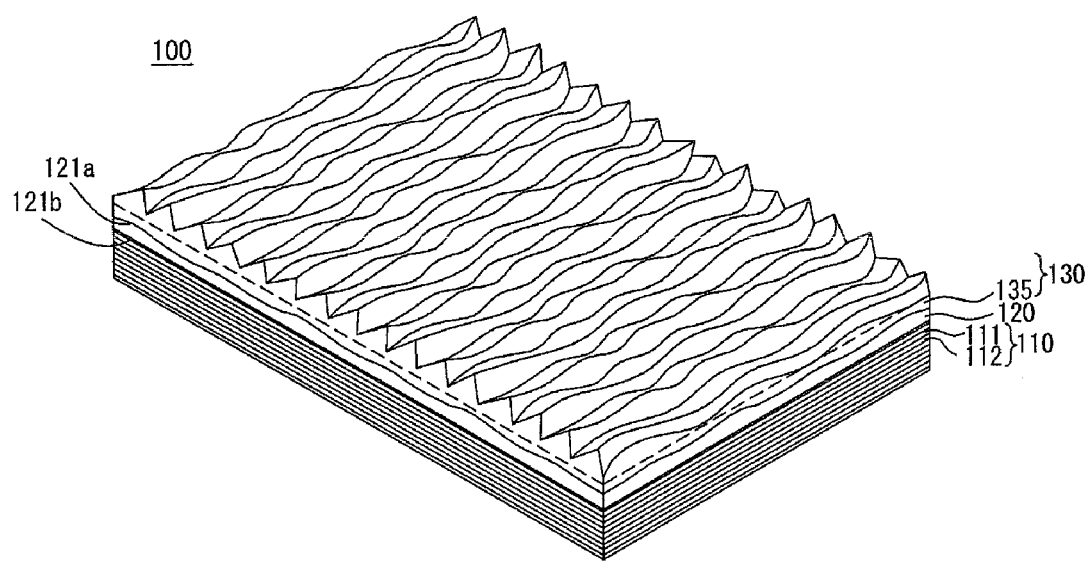
Figure 3:
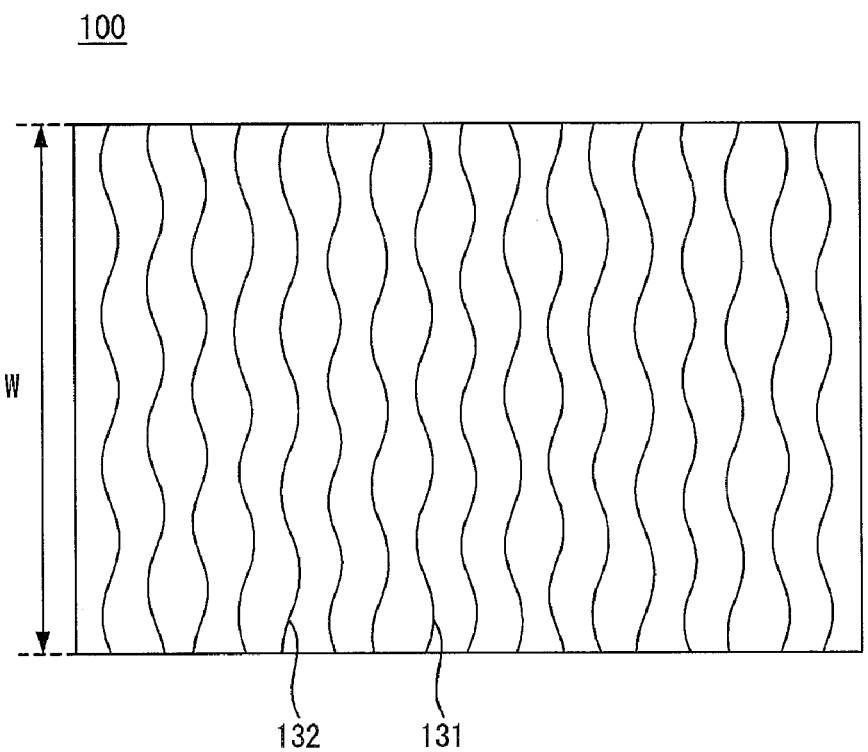

FIGS. 1 to 3 show an optical sheet according to an exemplary embodiment of the present invention. Other embodiments and configurations are also within the scope of the present invention.

As shown in FIGS. 1 to 3, an optical sheet 100 may include a reflective polarizing film 110, a base film 120 on one surface of the reflective polarizing film 110, and a plurality of projections 130 on the base film 120. The plurality of projections 130 extend away from the base film 120.

The reflective polarizing film 110 can transmit or reflect light coming from a light source. The reflective polarizing film 110 may include a first layer 111 formed of a polymer and a second layer 112 positioned adjacent to the first layer 111. The second layer 112 may be formed of a polymer having a refractive index different from a refractive index of the polymer forming the first layer 111.

The reflective polarizing film 110 may have a structure in which the first layers 111 and the second layers 112 are alternately stacked in a repeated manner. The first layers 111 may be formed of polymethylmethacrylate (PMMA), and the second layers 112 may be formed of polyester.

The reflective polarizing film 110 may have a thickness of approximately 100 µm to 300 µm in a small-sized display device. The reflective polarizing film 110 may have a thickness of approximately 700 µm to 800 µm in a large-sized display device.

A portion of the light coming from the light source may be transmitted by the reflective polarizing film 110, and another portion of the light coming from the light source may be reflected toward the light source underlying the reflective polarizing film 110. The light reflected toward the light source may be again reflected and may be incident on the reflective polarizing film 110. A portion of the light incident on the reflective polarizing film 110 may be transmitted by the reflective polarizing film 110, and another portion of the light incident on the reflective polarizing film 110 may be reflected toward the light source underlying the reflective polarizing film 110.

Because the reflective polarizing film 110 has the structure in which the polymer layers each having a different refractive index are alternately stacked, the reflective polarizing film 110 can improve efficiency of the light coming from the light source using a principle in which molecules of the polymer are oriented in one direction to transmit a polarization of a direction different from the orientation direction of the molecules and to reflect a polarization of the same direction as the orientation direction of the molecules.

The base film 120 may transmit the light from the light source. The base film 120 may be formed of a light transmitting material such as polyethylene terephthalate, polycarbonates, polypropylene, polyethylene, polystyrene, and/or polyepoxy. Other materials may be used for the light transmitting material.

The base film 120 may include a first surface 121a and a second surface 121b opposite the first surface 121a. The first surface 121a and/or the second surface 121b may have a curved or non-flat surface. FIG. 1 shows the first surface 121a having a curved or non-flat surface.

The base film 120 may have a structure in which peaks 125 and valleys 126 of the base film 120 are alternately formed in a repeated manner. One of the peaks 125 may be a highest position of the first surface 121a, and one of the valleys 126 may be a lowest position of the first surface 121a. Pitches of the peaks 125 may be uniform or pitches of the peaks may be non-uniform.

Differences between heights of the peaks 125 and the valleys 126 formed adjacent to each other on the first surface 121a may be uniform or may be non-uniform. The pitches of the peaks 125 and the height differences between the peaks 125 and the valleys 126 may be selected depending on a thickness and size of the base film 120, uniformity of a desired luminance, and a light diffusivity, etc.

The non-flat surface of the first surface 121a may be formed using one of a calendaring processing, an injection processing, a casting molding processing, etc. The non-flat surface may also be formed using another technique.

The base film 120 may be approximately 50 μm to 300 μm an average thickness to achieve a thin profile of a backlight unit. The average thickness of the base film 120 may be an average value of a distance between one of the peaks 125 of the first surface 121a and the second surface 121b and a distance between one of the valleys 126 of the first surface 121a and the second surface 121b.

When the average thickness of the base film 120 is equal to or greater than 50 μm, then the thin profile of the backlight unit can be achieved to a maximum level to an extent that mechanical properties and thermal resistance of the optical sheet 100 are not reduced (or are not substantially reduced). When the average thickness of the base film 120 is equal to or less than 300 μm, the thin profile of the backlight unit can be maximally achieved, and the mechanical properties and the thermal resistance of the optical sheet 100 can be maximized (and/or increased).

A thickness between the first surface 121a and the second surface 121b changes over a length of the base film 120. A first thickness T1 is a distance between the first surface 121a and the second surface 121b and the second thickness T2 is a distance between the first surface 121a and the second surface 121b. The first and second thickness T1 and T2, which are different from one another, may satisfy the following equation: $0.1 \, \mu m \leq |T1-T2| \leq 10 \, \mu m$.

The following Table 1 shows a diffusion effect and a luminance of the optical sheet 100 depending on a relationship between the first and second thickness T1 and T2. In the following Table 1, X, ○, and ⊚ represent bad, good, and excellent states of the characteristics, respectively.

TABLE 1

| $T_1-T_2$ (μm) | Diffusion Effect | Luminance |
|---|---|---|
| 0.05 | X | ⊚ |
| 0.1 | ○ | ⊚ |
| 1 | ○ | ⊚ |
| 3 | ○ | ○ |
| 5 | ○ | ○ |
| 7 | ○ | ○ |
| 9 | ⊚ | ○ |
| 10 | ⊚ | ○ |
| 15 | ⊚ | X |

As indicated in the above Table 1, when the first and second thickness T1 and T2 satisfy the following equation: $0.1 \, \mu m \leq |T1-T2|$, light from the light source may be diffused because of the non-flat surfaces on one surface of the base film 120. When the first and second thickness T1 and T2 satisfy the following equation: $|T1-T2| \leq 10 \, \mu m$, a reduction in the luminance resulting from a large height difference of the base film 120 can be prevented (and/or minimized).

The plurality of projections 130 on the base film 120 may focus and diffuse the light from the light source.

The plurality of projections 130 may be formed of a transparent polymer resin to transmit light coming from the outside. Examples of the transparent polymer resin include acrylic resin, polycarbonates, polypropylene, polyethylene, and polyethylene terephthalate.

A section of the projections 130 may include a plurality of triangle-shaped prisms. As shown in FIG. 1, the plurality of projections 130 may include a base portion 135 and a plurality of peaks 131 and a plurality of valleys 132. Each of the peaks 131 and the valleys 132 may be formed in a straight line pattern along a longitudinal direction of the plurality of projections 130.

A distance P between the peaks 131 of the projections 130 may be approximately 20 μm to 60 μm, and an angle A of one of the peaks 131 may be approximately 70° to 110°. A height H2 of the projections 130 may be equal to a height H2 of one of the peaks 131, and may be approximately 10 μm to 40 μm.

As shown in FIGS. 2 and 3, each of the peaks 131 and the valleys 132 may form continuous bending or meandering lines along the longitudinal direction of the projections 130. The continuous bending or meandering lines may be uniform or non-uniform. In other words, the peaks 131 may meander in an uneven pattern along a width W of the plurality of projections 130. An average horizontal amplitude of the peaks 131 may be approximately 1 μm to 20 μm. Further, the valleys 132 may meander in an uneven pattern along the width W of the plurality of projections 130. An average horizontal amplitude of the valleys 132 may be approximately 1 μm to 20 μm.

The height H2 of the peaks 131 of the projections 130 may be measured from a dotted line shown in FIG. 1. The dotted line may represent a horizontal line at a bottom of a valley closest to the base film 120. The height H2 may continuously change. A height of one of the peaks may also vary along a longitudinal direction of the plurality of projections. The peaks 131 may form uniform or non-uniform bending or meandering lines.

A height of the valleys 132 of the projections 130 is measured from the dotted line shown in FIG. 1. The height of the valleys 132 may continuously change. The valleys 132 may form uniform or non-uniform bending or meandering lines.

An average difference between the heights H2 of the peaks 131 may be approximately 1 μm to 20 μm.

The plurality of projections 130 includes the base portion 135, the plurality of peaks 131 and the plurality of valleys 132 formed from the plurality of peaks 131. The base portion 135 is between the base film 120 and the peaks 131 and the valleys 132. The plurality of peaks 131, the plurality of valleys 132, and the base portion 135 may form an integral body of the plurality of projections 130.

A height H1 of the base portion 135 may be approximately 5% to 50% of the height H2 of one of the peaks 131.

The following Table 2 shows light transmission characteristics and a defect check of the optical sheet 100 depending on a percentage of the height H2 of the base portion 135 based on the height H2 of the peak 131. In the following Table 2, X, ○, and ⊚ in the light transmission characteristics represent bad, good, and excellent states of the characteristics, respectively. Further, in the defect check, ○ represents that there are defects, and X represents that there are no defects.

TABLE 2

| Percentage of Height of Base Portion Based on Height of Peak (%) | Light Transmission characteristics | Defect Check |
|---|---|---|
| 1 | ⊚ | ○ |
| 3 | ⊚ | ○ |
| 5 | ⊚ | X |

TABLE 2-continued

| Percentage of Height of Base Portion Based on Height of Peak (%) | Light Transmission characteristics | Defect Check |
|---|---|---|
| 10 | ○ | X |
| 20 | ○ | X |
| 30 | ○ | X |
| 40 | ○ | X |
| 50 | ○ | X |
| 60 | X | X |
| 70 | X | X |
| 80 | X | X |

As show in FIG. 2, when the height H1 of the base portion 135 is equal to or greater than 5% of the height H2 of the peak 131, the base film 120 may be prevented from being damaged by pressure during fabrication of the plurality of projections 130. When the height H1 of the base portion 135 is equal to or less than 50% of the height H2 of the peak 131, a reduction in transmittance of the light from the light source resulting from the thick base portion 135 may be prevented (and/or reduced).

Accordingly, the height H1 of the base portion 135 may be approximately 0.1 μm to 20 μm.

As described above, the optical sheet 100 may improve diffusion efficiency of the light coming from the light source by forming the base film 120 including the non-flat (or curved) surface on the reflective polarizing film 110.

FIGS. 4 to 8 show an optical sheet according to an exemplary embodiment of the present invention. Other embodiments and configurations are also within the scope of the present invention.

Figure 4:
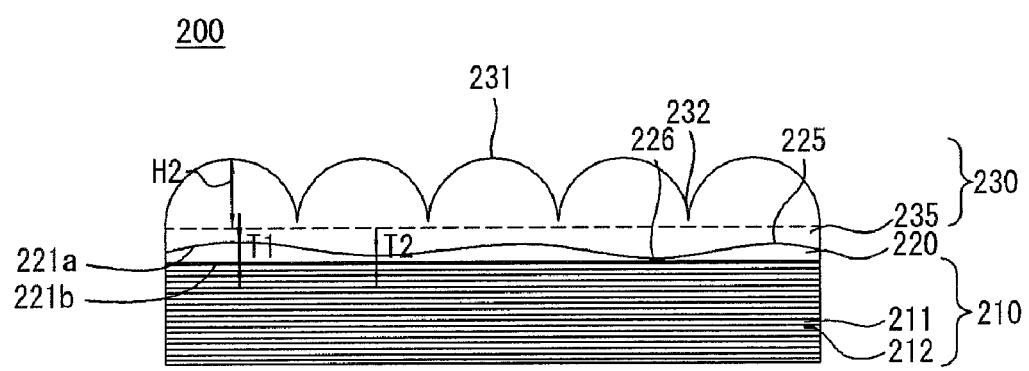
FIGS. 4 to 8 show an optical sheet according to an exemplary embodiment of the present invention.

As shown in FIG. 4, an optical sheet 200 may include a reflective polarizing film 210, a base film 220 on one surface of the reflective polarizing film 210, and a plurality of projections 230 on the base film 220.

Since a configuration of the reflective polarizing film 210 is the same as or is similar to the reflective polarizing film shown in FIGS. 1 to 3, a further description may be omitted. The reflective polarizing film 210 may have a structure in which the first layers 111 and the second layers are alternatively stacked in a repeated manner.

The base film 220 may transmit the light from the light source. The base film 220 may be formed of a light transmitting material such as polyethylene terephthalate, polycarbonates, polypropylene, polyethylene, polystyrene, and polyepoxy. Other materials may also be used.

The base film 220 may include a first surface 221a and a second surface 221b opposite the first surface 221a. The first surface 221a and/or the second surface 221b may have a curved or non-flat surface. FIG. 4 shows the first surface 221a having a curved or non-flat surface.

The base film 220 may have a structure in which peaks 225 and valleys 226 of the base film 220 are alternately formed in a repeated manner. Pitches of the peaks 225 may be uniform or pitches of the peaks 225 may be non-uniform.

Differences between heights of the peaks 225 and the valleys 226 formed adjacent to each other on the first surface 221a may be uniform or may be non-uniform. The pitches of the peaks 225 and the height differences between the peaks 225 and the valleys 226 may be selected depending on a thickness and size of the base film 220, uniformity of a desired luminance, and a light diffusivity, etc.

The non-flat surface of the first surface 221a may be formed using one of a calendaring processing, an injection processing, a casting molding processing, etc. The non-flat surface may also be formed using another technique.

The base film 220 may be approximately 50 μm to 300 μm an average thickness to achieve a thin profile of a backlight unit. The average thickness of the base film 220 may be an average value of a distance between one of the peaks 225 of the first surface 221a and the second surface 221b and a distance between one of the valleys 226 of the first surface 221a and the second surface 221b.

When the average thickness of the base film 220 is equal to or greater than 50 μm, then the thin profile of the backlight unit can be achieved to a maximum level to an extent that mechanical properties and thermal resistance of the optical sheet 200 are not reduced (or are not substantially reduced). When the average thickness of the base film 220 is equal to or less than 300 μm, the thin profile of the backlight unit can be maximally achieved, and the mechanical properties and the thermal resistance of the optical sheet 200 can be maximized (and/or increased).

A first thickness T1 is a distance between the first surface 221a and the second surface 221b and a second thickness T2 is a distance between the first surface 221a and the second surface 221b. The first and second thickness T1 and T2 satisfy the following equation: $0.1 \text{ μm} \leq |T1-T2| \leq 10 \text{ μm}$.

When the first and second thickness T1 and T2 satisfy the following equation: $0.1 \text{ μm} \leq |T1-T2|$, light coming from the light source may be diffused because of the non-flat surfaces on one surface of the base film 220. When the first and second thickness T1 and T2 satisfy the following equation: $|T1-T2| \leq 10 \text{ μm}$, a reduction in the luminance resulting from a large height difference of the base film 220 can be prevented (and/or minimized).

The plurality of projections 230 may be formed of a transparent polymer resin to transmit light coming from the outside. Examples of the transparent polymer resin include acrylic resin, polycarbonates, polypropylene, polyethylene, and polyethylene terephthalate.

The plurality of projections 230 may include a base portion 235, a plurality of peaks 231 and a plurality of valleys 232. A height of the base portion 235 may be approximately 5% to 50% of a height H2 of the projections 230. When the height of the base portion 235 is equal to or greater than 5% of the height H2 of the projections 230, the base film 220 may be prevented from being damaged by pressure during fabrication of the projections 230. When the height of the base portion 235 is equal to or less than 50% of the height H2 of the projections 230, a reduction in transmittance of the light from the light source resulting from the thick base portion 235 can be prevented.

The plurality of projections 230 may include a plurality of microlenses and/or a plurality of lenticular lenses.

Figure 5:
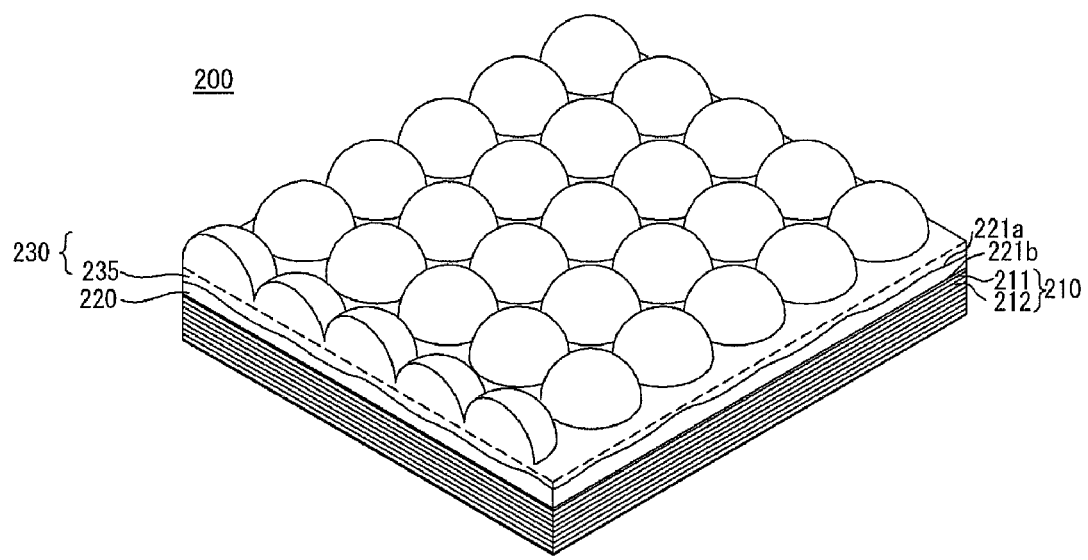
Figure 6:
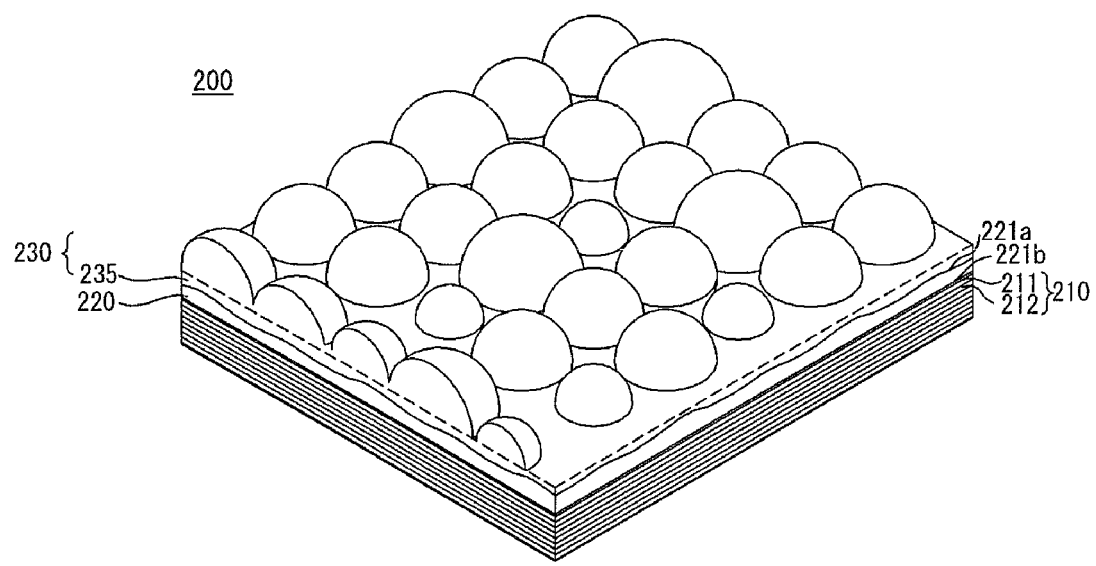

As shown in FIGS. 4 to 6, the microlenses may have an embossed form of hemispherical shape on one surface of the base film 220.

A diffusivity, a refractive index, a focusing level, etc. of the microlens may change depending on a pitch and a density of the microlens. Diameters of each of the microlenses may be uniform as shown in FIG. 5. Diameters of the microlenses may be non-uniform as shown in FIG. 6. Further, heights of the microlenses may be uniform or heights of the microlenses may be non-uniform.

The diameter of one of the microlenses may be approximately 20 μm to 200 μm. Other diameters may also be used. The microlens may occupy 50% to 90% of a whole area of the plurality of projections 230. Other percentages may also be used.

As described above, when the microlens has the embossed form of a hemispherical shape, a portion of light from the outside, for example, from a bottom of the microlens may be uniformly refracted from the hemispherical surface in an azimuth direction and then be transmitted by the microlens. Because of this, a portion of light coming from the bottom of the microlens may be uniformly diffused upward and can be focused.

Figure 7:
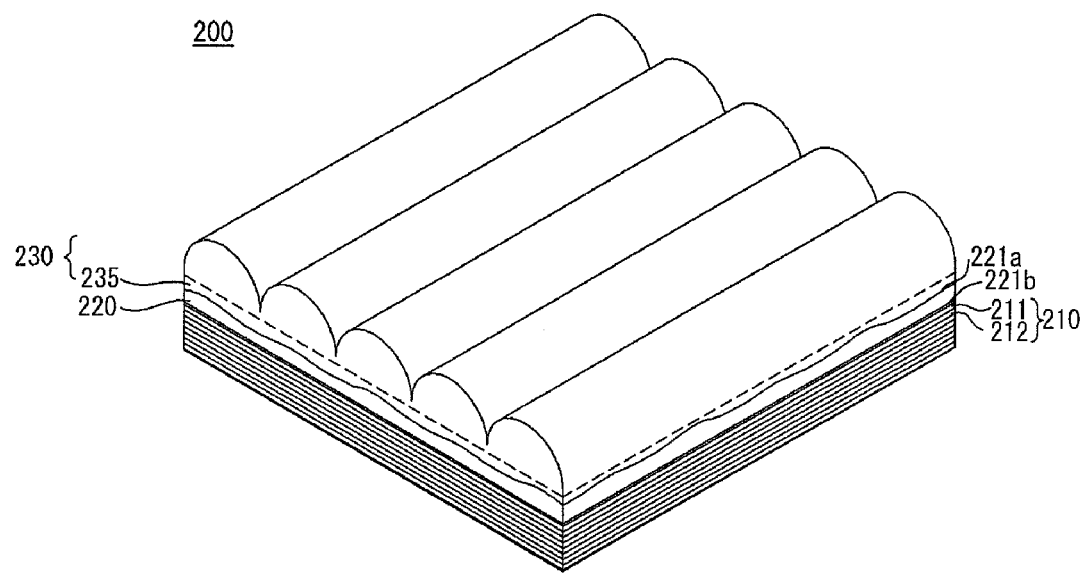
Figure 8:
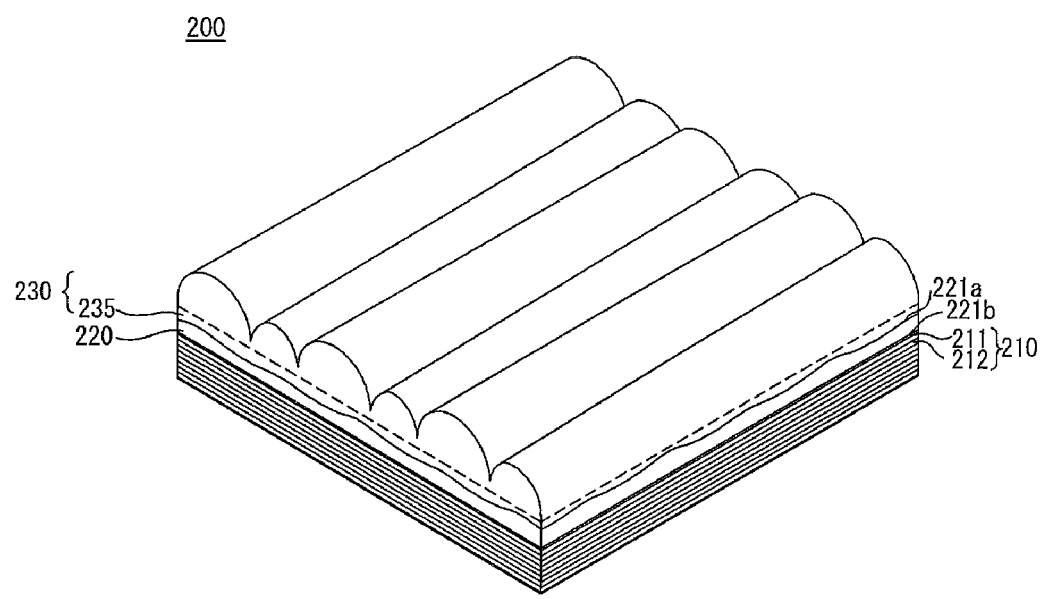

As shown in FIGS. 7 and 8, the plurality of projections 230 may include a plurality of lenticular lenses. The lenticular lenses may have a hemispherical shaped section. The lenticular lens may continuously extend in a longitudinal direction, unlike the embossed pattern of the microlens. For example, the lenticular lens may have a tunnel form.

Pitches of the lenticular lenses may be uniform as shown in FIG. 7. Pitches of the lenticular lenses may be non-uniform as shown in FIG. 8. Further, heights of the lenticular lenses may be uniform or may be non-uniform.

Figure 9:
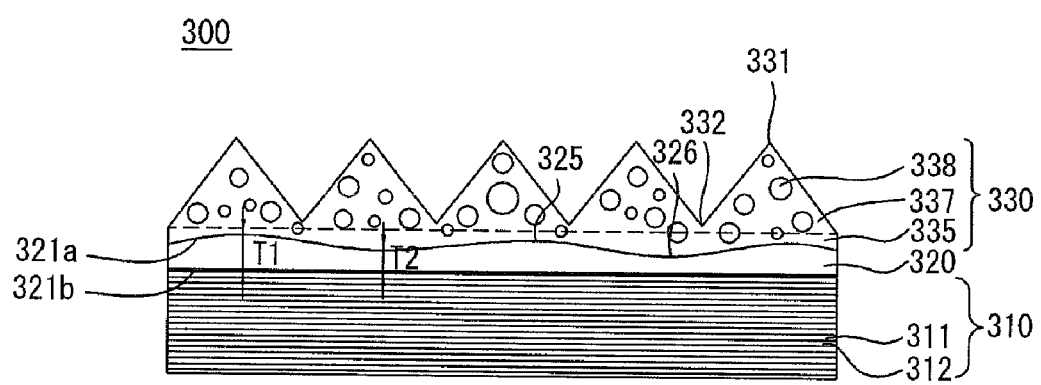
FIGS. 9 and 10 show an optical sheet according to an exemplary embodiment of the present invention.
Figure 10:
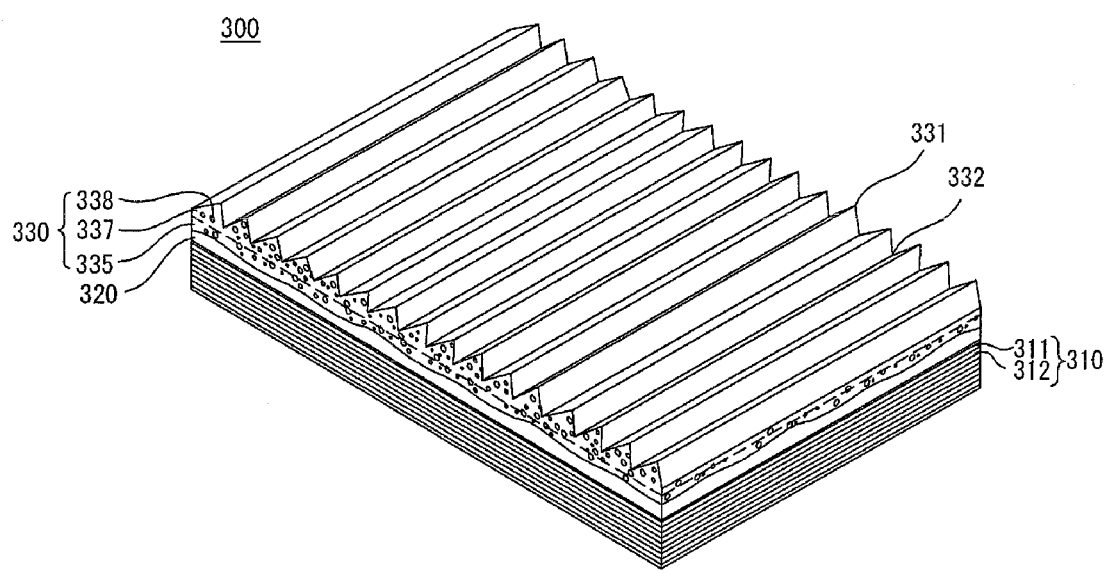

FIGS. 9 and 10 show an optical sheet according to an exemplary embodiment of the present invention. Other embodiments and configurations are also within the scope of the present invention.

As shown in FIGS. 9 and 10, an optical sheet 300 may include a reflective polarizing film 310, a base film 320 on one surface of the reflective polarizing film 310, and a plurality of projections 330 on the base film 320.

Since a configuration of the reflective polarizing film 310 is the same as or is similar to the reflective polarizing film shown in FIGS. 1 to 3, a further description may be omitted. The reflective polarizing film 310 may have a structure in which first layers 311 and second layers 312 are alternatively stacked in a repeated manner.

The base film 320 may transmit the light from the light source. The base film 320 may be formed of a light transmitting material such as polyethylene terephthalate, polycarbonates, polypropylene, polyethylene, polystyrene, and polyepoxy. Other materials may also be used.

The base film 320 may include a first surface 321a and a second surface 321b opposite the first surface 321a. The first surface 321a and/or the second surface 321b may include a curved or non-flat surface. FIG. 9 shows the first surface 321a having the non-flat surface.

The first surface 321a of the base film 320 may have a wave shape. Hence, the base film 320 may have a structure in which peaks 325 and valleys 326 of the base film 320 are alternately formed in a repeated manner. Pitches of the peaks 325 may be uniform or non-uniform.

Differences between heights of the peaks 325 and the valleys 326 formed adjacent to each other on the first surface 321a may be uniform or may be non-uniform. The pitches of the peaks 325 and the height differences between the peaks 325 and the valleys 326 may be selected depending on a thickness and size of the base film 320, uniformity of a desired luminance, and a light diffusivity, etc.

The non-flat surface of the first surface 321a may be formed using one of a calendaring processing, an injection processing, a casting molding processing, and the like. The non-flat surface may also be formed by another technique.

The base film 320 may be approximately 50 μm to 300 μm an average thickness to achieve a thin profile of a backlight unit. The average thickness of the base film 320 may be an average value of a distance between one of the peaks 325 of the first surface 321a and the second surface 321b and a distance between one of the valleys 326 of the first surface 321a and the second surface 321b.

When the average thickness of the base film 320 is equal to or greater than 50 μm, then the thin profile of the backlight unit can be achieved to a maximum level to an extent that mechanical properties and thermal resistance of the optical sheet 300 are not reduced (or are not substantially reduced).

When the average thickness of the base film 320 is equal to or less than 300 μm, the thin profile of the backlight unit can be maximally achieved, and the mechanical properties and the thermal resistance of the optical sheet 300 can be maximized (and/or increased).

A first thickness T1 is a distance between a first position of the first surface 321a and the second surface 321b and a second thickness T2 is a distance between the first surface 321a and the second surface 321b. The first and second thickness T1 and T2 satisfy the following equation: $0.1\ \mu m \leq |T1-T2| \leq 10\ \mu m$.

When the first and second thickness T1 and T2 satisfy the following equation: $0.1\ \mu m \leq |T1-T2|$, light coming from the light source may be diffused because of the non-flat surfaces on one surface of the base film 320. When the first and second thickness T1 and T2 satisfy the following equation: $|T1-T2| \leq 10\ \mu m$, a reduction in the luminance may be prevented (or reduced) because of a large height difference between the non-flat (or curved) surfaces of the base film 320.

The plurality of projections 330 may include a base portion 325, a plurality of peaks 321, a plurality of valleys 332, a first resin 337 and a plurality of beads 338.

The first resin 337 may be acrylic resin, and the beads 338 may be formed using at least one of polymethylmethacrylate (PMMA), polystyrene, and silicon.

The first resin 337 may include an antistatic agent. The antistatic agent may be formed of polyvinyl benzyl, polyacrylate (polymethacrylate), styrene acrylate (styrene methacrylate) copolymer, methacrylate methacrylamide copolymer, etc.

The plurality of projections 330 may be formed of the first resin 337, and the beads 338 may be provided in an amount of approximately 1 to 10 parts by weight based on 100 parts by weight of the first resin 337.

The following Table 3 shows diffusion characteristics and luminance characteristics of the optical sheet 300 depending on a content of the beads 338 based on 100 parts by weight of the first resin 337. In the following Table 3, X, ○, and ⊚ represent bad, good, and excellent states of the characteristics, respectively.

TABLE 3

| Content of First Beads Based on 100 Parts by Weight of First Resin (parts by weight) | Diffusion Characteristics | Luminance Characteristics |
| --- | --- | --- |
| 0.1 | X | ⊚ |
| 0.5 | X | ⊚ |
| 1 | ○ | ⊚ |
| 2 | ○ | ○ |
| 3 | ○ | ○ |
| 5 | ○ | ○ |
| 7 | ○ | ○ |
| 9 | ○ | ○ |
| 10 | ⊚ | ○ |
| 12 | ⊚ | X |
| 15 | ⊚ | X |

As indicated in the above Table 3, when the content of the beads 338 based on 100 parts by weight of the first resin 337 is equal to or greater than 1 part by weight, diffusion characteristics of the light from the light source may be excellent. When the content of the beads 338 based on 100 parts by weight of the first resin 337 is equal to or less than 10 parts by weight, a reduction in luminance may be prevented (and/or reduced)

Diameters of the beads 338 distributed inside the first resin 337 may be non-uniform.

The beads 338 may have a circle shape, an oval shape, a snowman shape, and/or an uneven circle shape. Other shapes may also be provided.

The beads 338 may be non-uniformly distributed inside the first resin 337. The beads 338 may be completely distributed inside the first resin 337 to not expose the beads 338 from a surface of the plurality of projections 330. The beads 338 may be embedded inside the first resin 337 forming the plurality of projections 330.

As described above, the optical sheet 300 may diffuse the light from the light source to provide the uniform luminance by including the beads 338 inside the plurality of projections 330.

Figure 11:
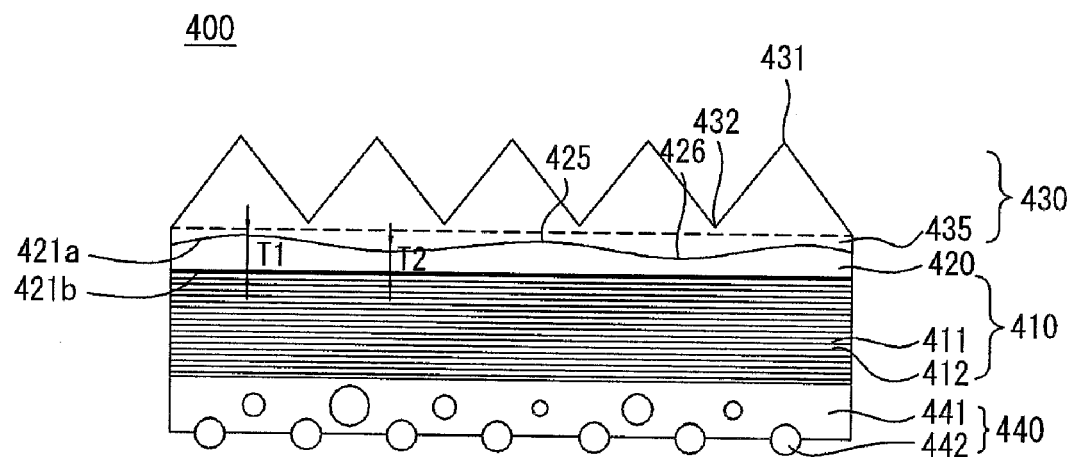
FIGS. 11 and 12 show an optical sheet according to an exemplary embodiment of the present invention.
Figure 12:
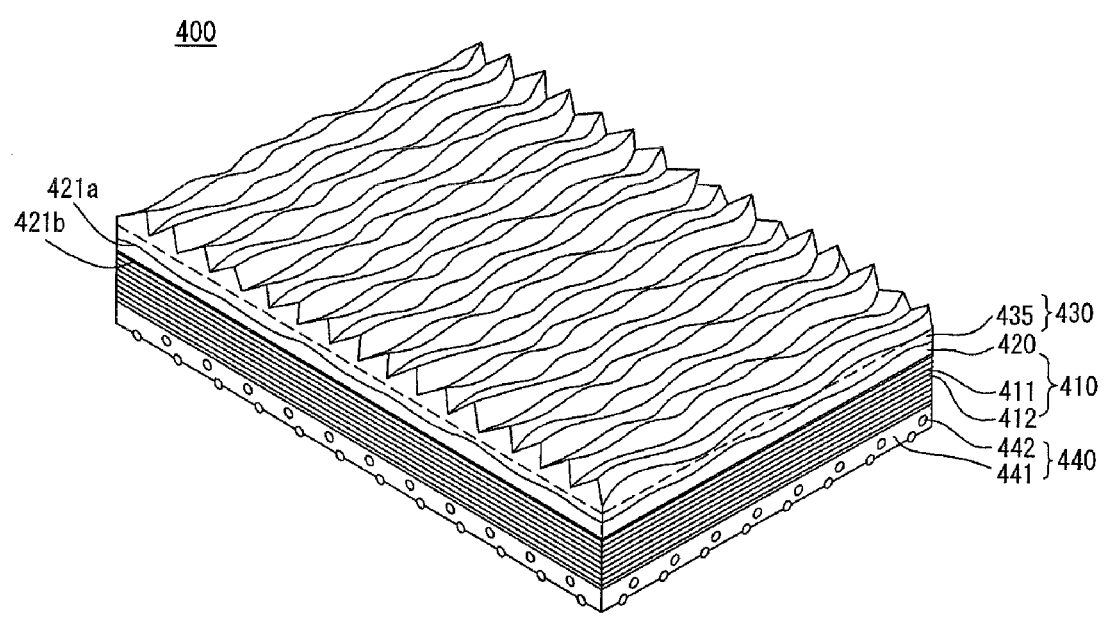

FIGS. 11 and 12 show an optical sheet according to an exemplary embodiment of present the invention. Other embodiments and configurations are also within the scope of the present invention.

As shown in FIGS. 11 and 12, an optical sheet 400 may include a reflective polarizing film 410, a base film 420 on one surface of the reflective polarizing film 410, a plurality of projections 430 on the base film 420, and a protective layer 440 on another surface (or under) the reflective polarizing film 410.

Since a configuration of the reflective polarizing film 410 is the same as or similar to the reflective polarizing film shown in FIGS. 1 to 3, a further description thereof may be omitted. The reflective polarizing film 410 may have a structure in which first layers 411 and second layers 412 are alternatively stacked in a repeated manner The base film 420 may transmit the light from the light source. For this, the base film 420 may be formed of a light transmitting material such as polyethylene terephthalate, polycarbonates, polypropylene, polyethylene, polystyrene, and/or polyepoxy. Other materials may also be used.

The base film 420 may include a first surface 421a and a second surface 421b opposite the first surface 421a. The first surface 421a and/or the second surface 421b may have a curved or non-flat surface. FIG. 11 shows the first surface 421a having a curved or non-flat surface.

The base film 420 may have a structure in which peaks 425 and valleys 426 of the base film 420 are alternately formed in a repeated manner. Pitches of the peaks 425 may be uniform or pitches of the peaks 425 may be non-uniform.

Differences between heights of the peaks 425 and the valleys 426 formed adjacent to each other on the first surface 421a may be uniform or may be non-uniform. The pitches of the peaks 425 and the height differences between the peaks 425 and the valleys 426 may be selected depending on a thickness and a size of the base film 420, uniformity of a desired luminance, and a light diffusivity, etc.

The non-flat surface of the first surface 421a may be formed using one of a calendaring processing, an injection processing, a casting molding processing, etc. The non-flat surface may also be formed by other techniques.

The base film 420 may be approximately 50 μm to 300 μm an average thickness to achieve a thin profile of a backlight unit. The average thickness of the base film 420 may be an average value of a distance between one of the peaks 425 of the first surface 421a and the second surface 421b and a distance between one of the valleys 426 of the first surface 421a and the second surface 421b.

When the average thickness of the base film 420 is equal to or greater than 50 μm, then the thin profile of the backlight unit can be achieved to a maximum level to an extent that mechanical properties and thermal resistance of the optical sheet 400 are not reduced (or are not substantially reduced). When the average thickness of the base film 420 is equal to or less than 300 μm, the thin profile of the backlight unit can be maximally achieved, and the mechanical properties and the thermal resistance of the optical sheet 400 can be maximized (and/or increased).

A first thickness T1 is a distance between the first surface 421a and the second surface 421b and a second thickness T2 is a distance between the first surface 421a and the second surface 421b. The first and second thickness T1 and T2 satisfy the following equation: $0.1\ \mu m \leq |T1-T2| \leq 10\ \mu m$.

When the first and second thickness T1 and T2 satisfy the following equation: $0.1\ \mu m \leq |T1-T2|$, light coming from the light source may be diffused because of the non-flat surfaces on one surface of the base film 420. When the first and second thickness T1 and T2 satisfy the following equation: $|T1-T2| \leq 10\ \mu m$, a reduction in the luminance can be prevented (and/or minimized) because of a large height difference between the non-flat (or curved) surfaces of the base film 420.

The plurality of projections 430 may be formed of a transparent polymer resin to transmit light coming from the outside. Examples of the transparent polymer resin include acrylic resin, polycarbonates, polypropylene, polyethylene, and polyethylene terephthalate.

The plurality of projections 430 may include a plurality of prisms, a plurality of microlenses, and a plurality of lenticular lenses. As one example, the plurality of prisms form a plurality of peaks 431 and a plurality of valleys 432. The plurality of projections 430 may also include a plurality of beads.

The protective layer 440 may improve thermal resistance of the optical sheet 400. The protective layer 440 may include a second resin 441 and a plurality of beads 442 distributed inside the second resin 441.

The second resin 441 may be transparent acrylic resin whose thermal resistance and mechanical characteristics are excellent. The second resin 441 may be the same as the first resin described with reference to FIGS. 9 and 10. The second resin 441 may include an antistatic agent. The antistatic agent may be formed of polyvinyl benzyl, polyacrylate(polymethacrylate), styrene acrylate(styrene methacrylate)copolymer, methacrylate methacrylamide copolymer, etc.

The beads 442 may be formed using the same material as a formation material of the second resin 441 or using a material different from the formation material of the second resin 441.

The protective layer 440 may be formed of the second resin 441, and the beads 442 may be provided in an amount of approximately 10 to 50 parts by weight based on 100 parts by weight of the second resin 441.

The size of the beads 442 may be selected depending on a thickness of the reflective polarizing film 410, and may be approximately 2 μm to 10 μm.

The size of the beads 442 may be substantially equal to each other and the beads 442 may be uniformly distributed inside the second resin 441. The size of the beads 442 may be different from each other and the beads 442 may be non-uniformly distributed inside the second resin 441. The beads 442 may be embedded inside the second resin 441 forming the protective layer 440. A portion of the beads 442 may be exposed outside the second resin 441 forming the protective layer 440. The beads 442 may be formed using the same material as a formation material of the beads 338 or using a material different from the formation material of the beads 338.

The protective layer 440 may prevent the optical sheet 400 from being deformed by the light from the light source. The second resin 441 having excellent thermal resistance may prevent the optical sheet 400 from crumpling. Even if the optical sheet 400 is deformed at a high temperature, the optical sheet 400 may be restored to its original state at a normal temperature. The protective layer 440 may prevent the generation of a flaw on the optical sheet 400 caused by an external impact or mechanical force. The protective layer 440 may improve uniformity of luminance by diffusing the light coming from the light source using the beads 442.

Figure 13:
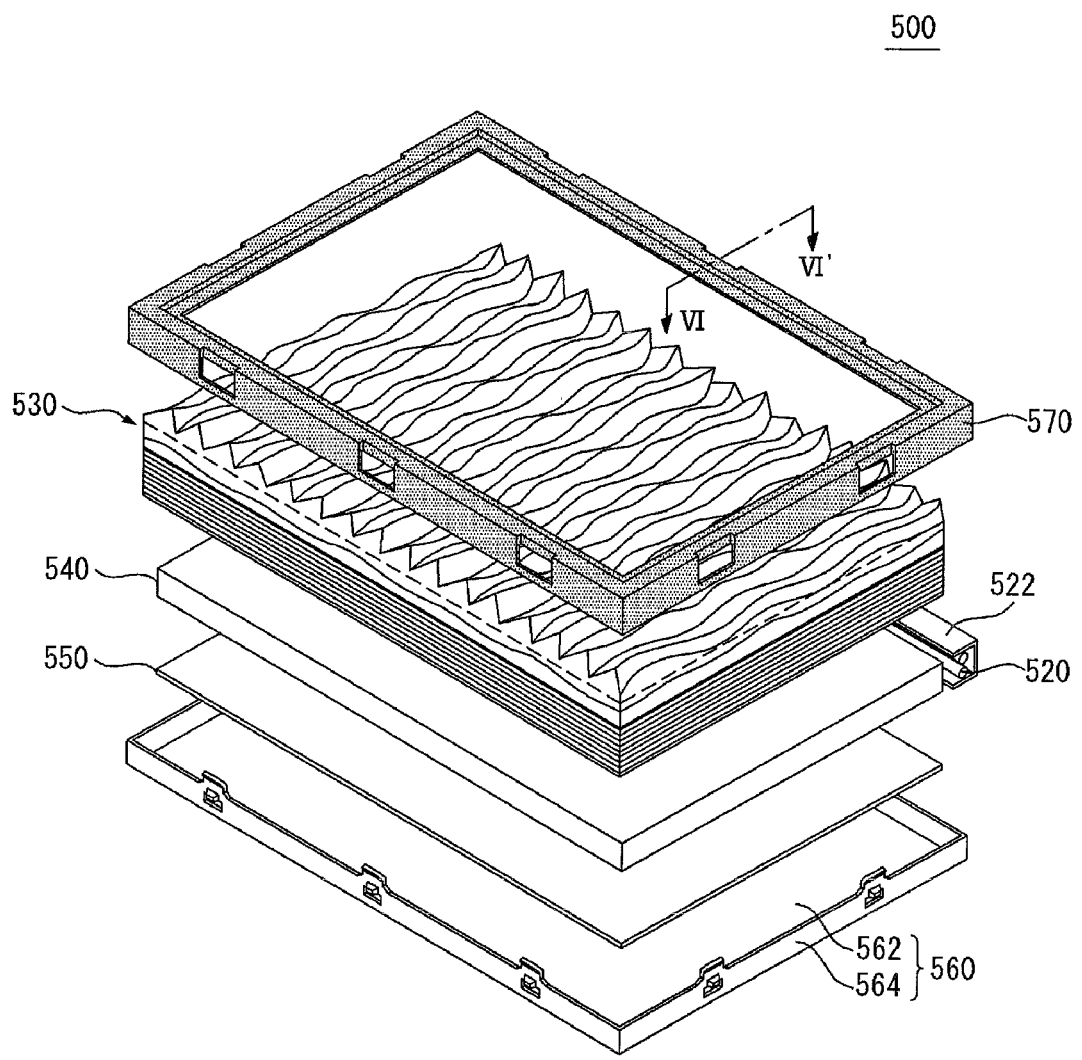
FIGS. 13 and 14 are an exploded perspective view and a cross-sectional view illustrating a configuration of a backlight unit including an optical sheet according to exemplary embodiments of the present invention.
Figure 14:
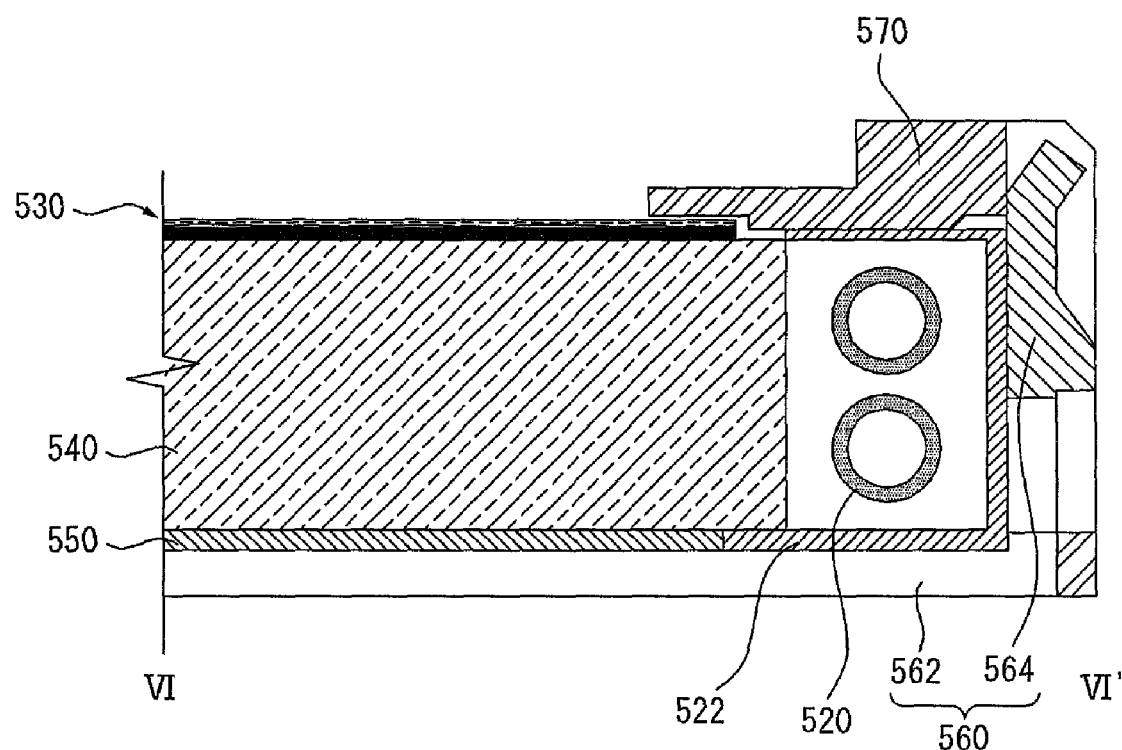

FIGS. 13 and 14 are an exploded perspective view and a cross-sectional view illustrating a configuration of a backlight unit including an optical sheet according to exemplary embodiments of the present invention. Other embodiments and configurations are also within the scope of the present invention.

FIGS. 13 and 14 show an edge type backlight unit. Since configuration of an optical sheet shown in FIGS. 13 and 14 is substantially the same as the optical sheets described above, a further description may be briefly made or may be entirely omitted.

As shown in FIGS. 13 and 14, the backlight unit 500 may be included in a liquid crystal display and may provide light to a liquid crystal display panel included in the liquid crystal display.

The backlight unit 500 may include a light source 520 and an optical sheet 530 to receive light from the light source 520. The backlight unit 500 may further include a light guide 540 (or light guide plate), a reflector 550 (or a reflector plate), a bottom cover 560, and a mold frame 570.

The light source 520 may produce light using a drive power received from outside the light source and may emit the produced light.

At least one light source 520 may be positioned at one side of the light guide 540 along a long axis direction of the light guide 540. At least one light source 520 may be positioned at both sides of the light guide 540. Light from the light source 520 may be directly incident on the light guide 540. Alternatively, the light from the light source 520 may be reflected from a light source housing 522 surrounding a portion of the light source 520, for example, surrounding about ¾ of an outer circumferential surface of the light source 520, and then the light may be incident on the light guide 540.

The light source 520 may be one of a cold cathode fluorescent lamp (CCFL), a hot cathode fluorescent lamp (HCFL), an external electrode fluorescent lamp (EEFL), and a light emitting diode (LED). Other light sources may also be used.

The optical sheet 530 may be positioned on the light guide 540. The optical sheet 530 can focus light from the light source 520.

The optical sheet 530 may include a reflective polarizing film, a base film on one surface of the reflective polarizing film, and a plurality of projections on the base film. The base film may include a first surface and a second surface opposite the first surface. A first thickness T1 between the first surface and the second surface may be different from a second thickness T2 between the first surface and the second surface. The first and second thickness T1 and T2 may satisfy the following equation: $0.1\ \mu m \leq |T1-T2| \leq 10\ \mu m$.

If light from the light source 520 under the optical sheet 530 is incident on the optical sheet 530, the incident light may be reflected or transmitted by the reflective polarizing film. Efficiency of the light from the light source 520 may be improved. The base film having a curved or non-flat surface may diffuse the light transmitted by the reflective polarizing film to provide uniform luminance. As a result, a display quality of the backlight unit 500 may be improved.

The light guide 540 may face the light source 520. The light guide 540 may guide the light to emit the light from the light source 520 in an upward manner.

The reflector 550 may be positioned under the light guide 540. The reflector 550 can reflect the light that comes from the light source 520 in an upward manner and the light may then be emitted downward via the light guide 540.

The bottom cover 560 may include a bottom portion 562 and a side portion 564 extending from the bottom portion 562 to form a recipient space. The recipient space may receive the light source 520, the optical sheet 530, the light guide 540, and the reflector 550.

The mold frame 570 may be approximately a rectangular-shaped frame. The mold frame 570 may be fastened to the bottom cover 560 from an upper side of the bottom cover 560 in a top-down manner.

Figure 15:
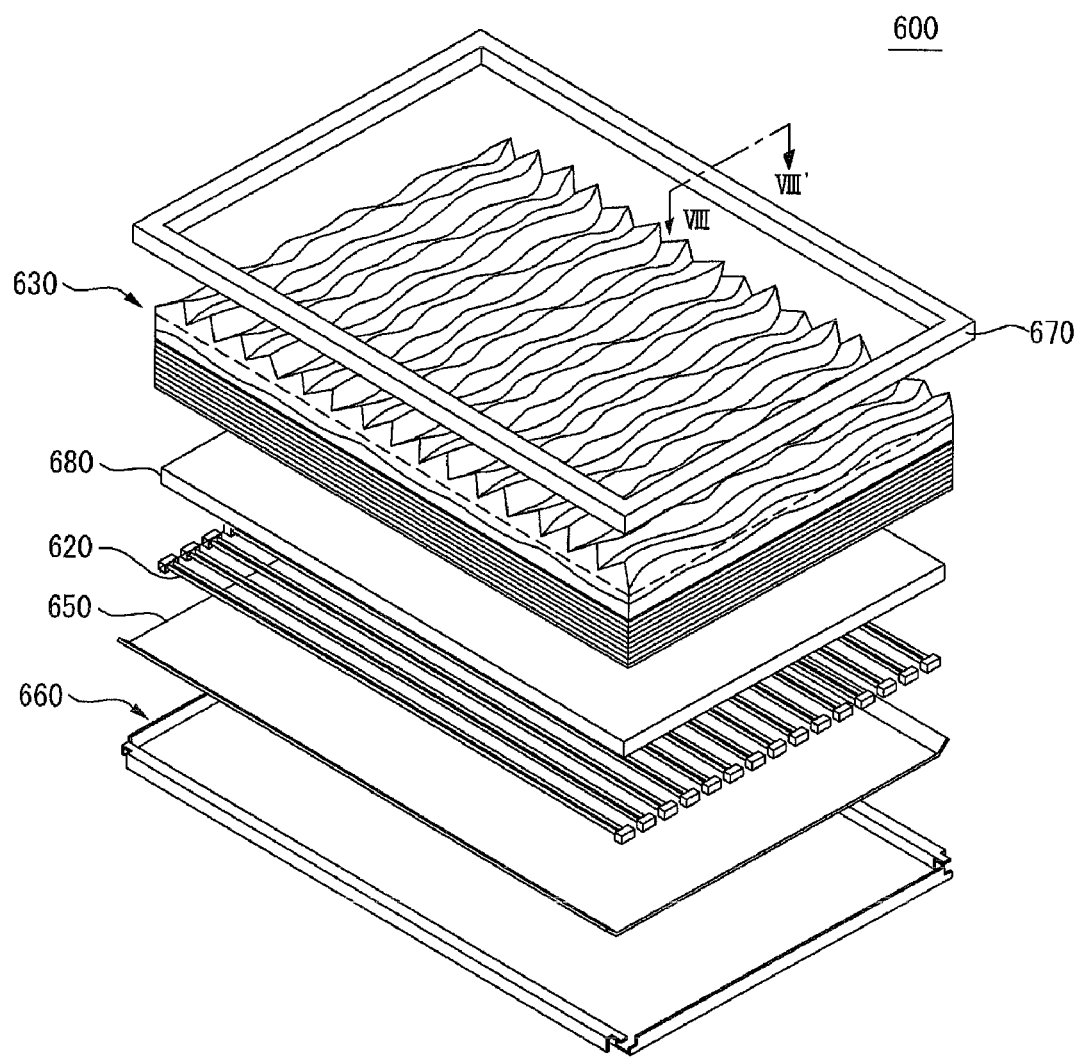
FIGS. 15 and 16 are an exploded perspective view and a cross-sectional view illustrating a configuration of a backlight unit according to an exemplary embodiment of the present invention.
Figure 16:
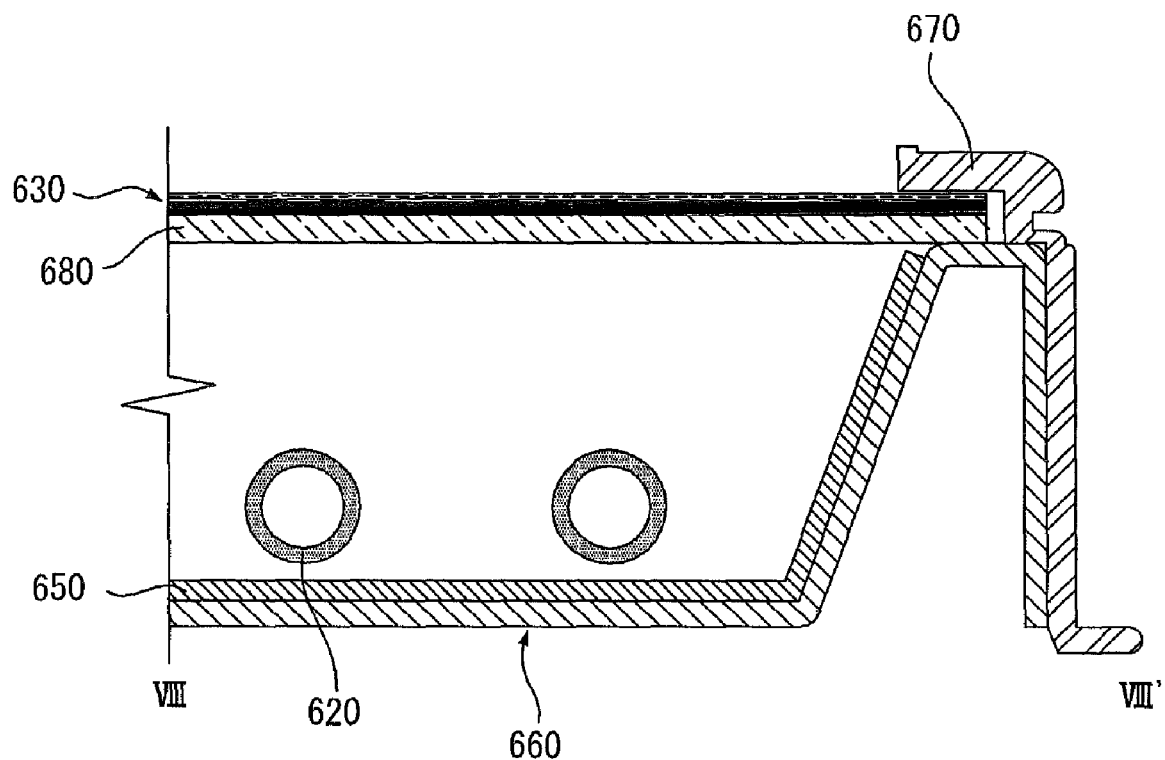

FIGS. 15 and 16 are an exploded perspective view and a cross-sectional view illustrating a configuration of a backlight unit according to an exemplary embodiment of the present invention. Other embodiments and configurations are also within the scope of the present invention.

FIGS. 15 and 16 show a direct type backlight unit. Since a backlight unit shown in FIGS. 15 and 16 may be substantially the same as the backlight unit shown in FIGS. 13 and 14 (except a location of a light source and changes in components depending on location of the light source), a further description may be briefly made or may be entirely omitted.

As shown in FIGS. 15 and 16, the backlight unit 600 may be included in a liquid crystal display and may provide light to a liquid crystal display panel included in the liquid crystal display.

The backlight unit 600 may include a light source 620 and an optical sheet 630. The backlight unit 600 may further include a reflector 650 (or reflector plate), a bottom cover 660, a mold frame 670, and a diffusion plate 680.

At least one light source 620 may be positioned under the diffusion plate 680. Therefore, light from the light source 620 can be directly incident on the diffusion plate 680.

The optical sheet 630 may be positioned on the diffusion plate 680. The optical sheet 630 may focus the light coming from the light source 620.

The optical sheet 630 may include a reflective polarizing film, a base film on one surface of the reflective polarizing film, and a plurality of projections on the base film. The base film may include a first surface and a second surface opposite the first surface. A first thickness T1 is a distance between the first surface and the second surface and a second thickness T2 is a distance between the first surface and the second surface. The first and second thickness T1 and T2 may satisfy the following equation: $0.1\ \mu m \leq |T1-T2| \leq 10\ \mu m$.

If light from the light source 620 under the optical sheet 530 is incident on the optical sheet 630, the incident light may be reflected or transmitted by the reflective polarizing film. Efficiency of the light from the light source 620 may be improved. The base film having a curved or non-flat surface diffuses the light transmitted by the reflective polarizing film to provide uniform luminance. As a result, a display quality of the backlight unit 600 may be improved.

The diffusion plate 680 may be positioned between the light source 620 and the optical sheet 630 and may diffuse the light from the light source 620 in an upward manner. The light source 620 may not be seen from a top of the backlight unit 600 because of the diffusion plate 680 on the light source 620. The diffusion plate 680 may further diffuse the light from the light source 620.

Figure 17:
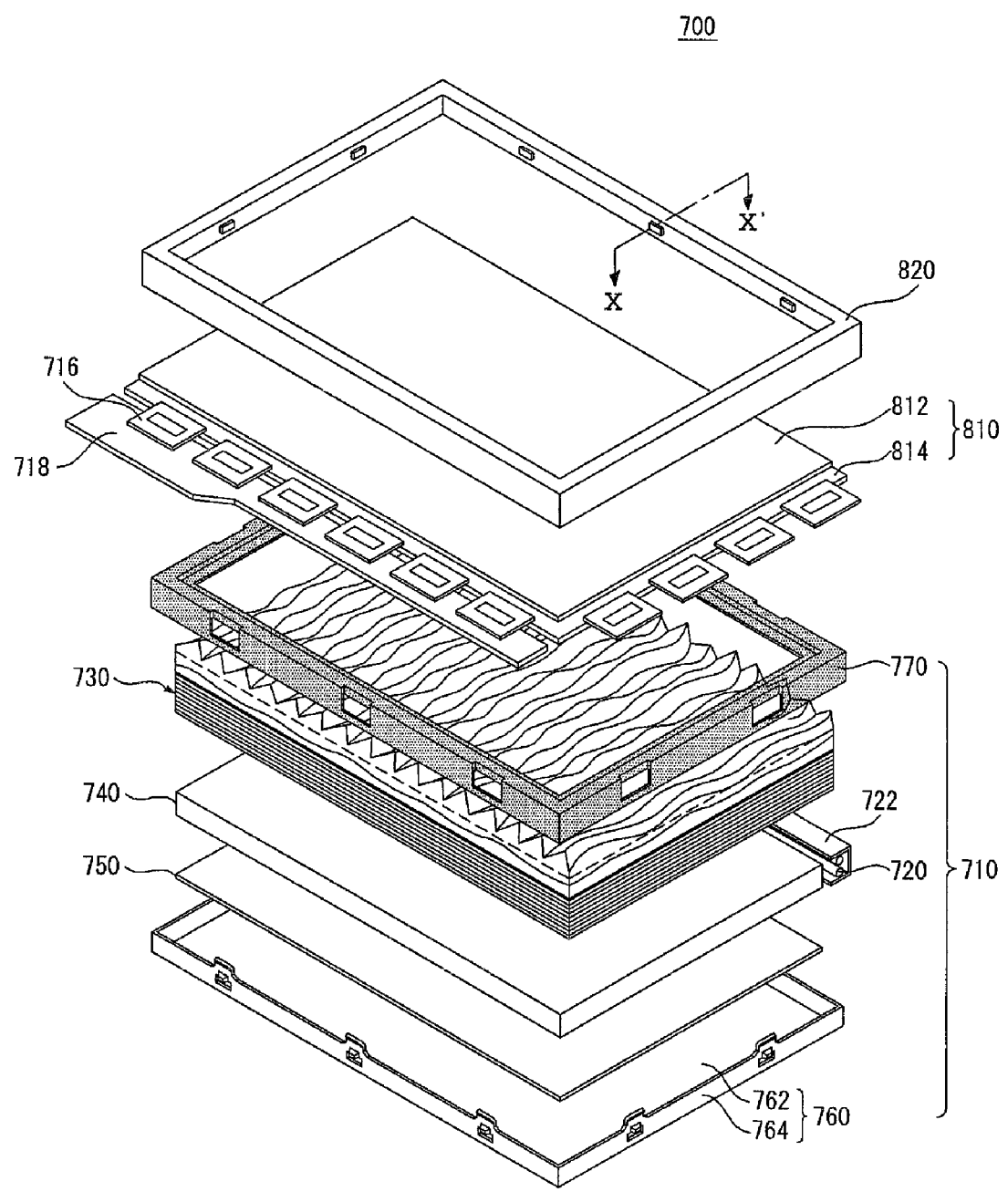
FIGS. 17 and 18 are an exploded perspective view and a cross-sectional view illustrating a configuration of a liquid crystal display according to an exemplary embodiment of the present invention.
Figure 18:
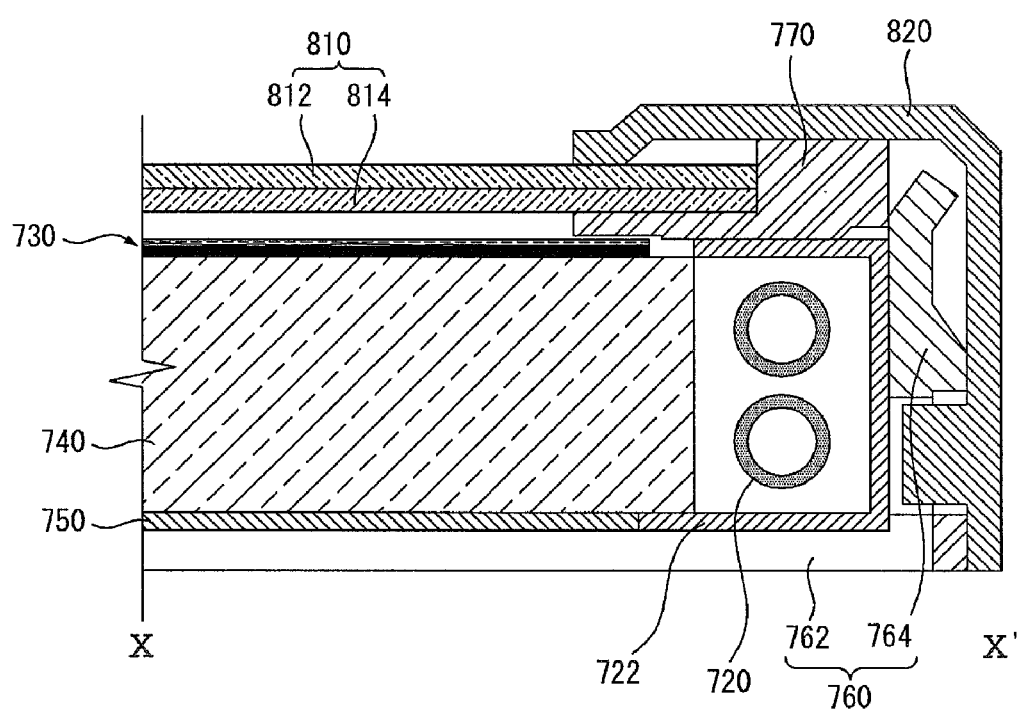

FIGS. 17 and 18 are an exploded perspective view and a cross-sectional view illustrating a configuration of a liquid crystal display according to an exemplary embodiment of the present invention. Other embodiments and configurations are also within the scope of the present invention.

The liquid crystal display 700 shown in FIGS. 17 and 18 includes the backlight unit shown in FIGS. 13 and 14, but is not limited thereto. For example, the liquid crystal display 700 may include the backlight unit shown in FIGS. 15 and 16. Since a backlight unit 710 shown in FIGS. 17 and 18 is described above with reference to FIGS. 13 and 14, a further description thereabout may be briefly made or may be omitted.

As shown in FIGS. 17 and 18, the liquid crystal display 700 may display an image using electro-optical characteristics of liquid crystals.

The liquid crystal display 700 may include the backlight unit 710 and a liquid crystal display panel 810.

The backlight unit 710 may be positioned under the liquid crystal display panel 810 and may provide the liquid crystal display panel 810 with light.

The backlight unit 710 may include a light source 720 and an optical sheet 730. Light from the light source 720 may be reflected from a light source housing 722. The backlight unit 710 may further include a light guide 740 (or light guide plate), a reflector 750 (or reflector plate), a bottom cover 760, and a mold frame 770.

The liquid crystal display panel 810 may be positioned on the mold frame 770. The liquid crystal display panel 810 may be fixed by a top cover 820 that is fastened to the bottom cover 760 in a top-down manner. The bottom cover may include a bottom portion 762 and a side portion 764 extending from the bottom portion to form a recipient space.

The liquid crystal display panel 810 may display an image using light provided by the light source 720 of the backlight unit 710.

The liquid crystal display panel 810 may include a color filter substrate 812 and a thin film transistor substrate 814 that are opposite to each other with liquid crystals interposed between the color filter substrate 812 and the thin film transistor substrate 814.

The color filter substrate 812 may achieve colors of an image displayed on the liquid crystal display panel 810.

The color filter substrate 812 may include a color filter array of a thin film form on a substrate made of a transparent material such as glass or plastic. For example, the color filter substrate 812 may include red, green, and blue color filters. An upper polarizing plate may be positioned on the color filter substrate 812.

The thin film transistor substrate 814 may be electrically connected to a printed circuit board 718, on which a plurality of circuit parts are mounted, through a drive film 716. The thin film transistor substrate 814 may apply a drive voltage provided by the printed circuit board 718 to the liquid crystals in response to a drive signal provided by the printed circuit board 718.

The thin film transistor substrate 814 may include a thin film transistor and a pixel electrode on another substrate made of a transparent material such as glass or plastic. A lower polarizing plate may be positioned under the thin film transistor substrate 814.

As described above, the optical sheet, the backlight unit including the optical sheet, and the liquid crystal display including the backlight unit may provide uniform luminance by forming the base film having the curved or non-flat surface on the reflective polarizing film, thereby providing the uniform luminance and improving the display quality.

Exemplary embodiments of the present invention may provide an optical sheet, a backlight unit including the optical sheet, and/or a liquid crystal display including the backlight unit that are capable of achieving uniform luminance.

An optical sheet may include a reflective polarizing film, a base film on one surface of the reflective polarizing film, the base film including a first surface and a second surface opposite the first surface, and a plurality of projections on the base film, the plurality of projections to extend away from the base film. A first thickness T1 is a distance between the first surface and the second surface and the second thickness T is another distance between the first surface and the second surface. Stated differently, the first thickness is a distance from the first surface to the second surface and the second thickness is another distance from the first surface to the second surface. The first and second thickness T1 and T2 satisfy the following equation: $0.1\ \mu m \leq |T1-T2| \leq 10\ \mu m$.

An average thickness of the base film may be approximately 50 μm to 300 μm.

The projection may include first resin and a plurality of beads. The resin may be a cured resin. The beads may be provided in an amount of approximately 1 to 10 parts by weight based on 100 parts by weight of the resin.

The first resin may be an antistatic agent.

The plurality of projections may include a plurality of peaks and the peaks may form a plurality of valleys. At least one of the peaks and the valleys may meander in an uneven pattern along a width of the plurality of projections.

A height of at least one of the peaks varies along a longitudinal direction of the plurality of projections.

The plurality of projections may include a base portion and a plurality of peaks that extend from the base portion. The plurality of peaks form a plurality of valleys.

A height of the base portion may be approximately 5% to 50% of a height of one of the plurality of peaks.

The reflective polarizing film may include a first layer and a second layer, and a refractive index of the first layer may be different from a refractive index of the second layer.

The optical sheet may further include a protective layer on another surface of the reflective polarizing film.

The protective layer may include resin and beads. The beads may be provided in an amount of approximately 10 to 50 parts by weight based on 100 parts by weight of the resin. At least one of the beads may protrude from the protective layer.

The plurality of projections may include at least one of a prism, a microlens, and a lenticular lens.

The plurality of peaks, the plurality of valleys, and the base portion may form an integral body of plurality of protrusions.

A backlight unit may include a light source, and an optical sheet to receive light from the light source. The optical sheet may include a reflective polarizing film, a base film on one surface of the reflective polarizing film, the base film including a first surface and a second surface opposite the first surface, and a plurality of projections on the base film. A first thickness T1 between a first position of the first surface and the second surface is different from a second thickness T2 between a second position of the first surface and the second surface. The first and second thickness T1 and T2 satisfy the following equation: $0.1\ \mu m \leq |T1-T2| \leq 10\ \mu m$.

A liquid crystal display may include a light source, an optical sheet to receive light from the light source, and a liquid crystal display panel on the optical sheet. The optical sheet may include a reflective polarizing film, a base film on one surface of the reflective polarizing film, the base film including a first surface and a second surface opposite the first surface, and a plurality of projections on the base film. A first thickness T1 between a first position of the first surface and the second surface is different from a second thickness T2 between a second position of the first surface and the second surface. The first and second thickness T1 and T2 satisfy the following equation: $0.1 \ \mu m \leq |T1-T2| \leq 10 \ \mu m$.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical sheet comprising:
   a reflective polarizing film;
   a base film on one surface of the reflective polarizing film, the base film including a first surface and a second surface opposite the first surface; and
   a plurality of projections on the base film, the plurality of projections to extend away from the base film,
   wherein T1 represents a first thickness between the first surface and the second surface, T2 represents a second thickness between the first surface and the second surface, and T1 and T2 substantially satisfy the following equation: $0.1 \ \mu m \leq |T1-T2| \leq 10 \ \mu m$.

2. The optical sheet of claim 1, wherein the first thickness T1 is a maximum thickness between the first surface and the second surface and the second thickness T2 is a minimum thickness between the first surface and the second surface.

3. The optical sheet of claim 1, wherein a thickness between the first surface and the second surface changes over a length of the base film.

4. The optical sheet of claim 1, wherein an average thickness of the base film is approximately 50 μm to 300 μm.

5. The optical sheet of claim 1, wherein the plurality of projections includes resin and a plurality of beads.

6. The optical sheet of claim 5, wherein the resin is a cured resin.

7. The optical sheet of claim 5, wherein the beads are provided in an amount of approximately 1 to 10 parts by weight based on 100 parts by weight of the resin.

8. The optical sheet of claim 1, wherein the plurality of projections include a plurality of peaks and the peaks form a plurality of valleys, and at least one of the peaks and the valleys meander in an uneven pattern along a width of the plurality of the projections.

9. The optical sheet of claim 1, wherein the plurality of projections include a plurality of peaks, and a height of at least one of the peaks varies along a longitudinal direction of the plurality of projections.

10. The optical sheet of claim 1, wherein the plurality of projections include a base portion and a plurality of peaks that extend from the base portion, and the plurality of peaks form a plurality of valleys.

11. The optical sheet of claim 10, wherein a height of the base portion is approximately 5% to 50% of a height of one of the plurality of peaks.

12. The optical sheet of claim 10, wherein the plurality of peaks, the plurality of valleys, and the base portion form an integral body of the plurality of projections.

13. The optical sheet of claim 1, wherein the reflective polarizing film includes a first layer and a second layer, and wherein a refractive index of the first layer is different from a refractive index of the second layer.

14. The optical sheet of claim 1, further comprising a protective layer on another surface of the reflective polarizing film.

15. The optical sheet of claim 14, wherein the protective layer includes resin and beads, and wherein the beads are provided in an amount of approximately 10 to 50 parts by weight based on 100 parts by weight of the resin.

16. The optical sheet of claim 15, wherein at least one of the beads protrudes from the protective layer.

17. The optical sheet of claim 1, wherein the plurality of projections include at least one of a prism, a microlens, and a lenticular lens.

18. An apparatus comprising:
    a light source; and
    an optical sheet to receive light from the light source, the optical sheet including:
    a reflective polarizing film,
    a base film on one surface of the reflective polarizing film, the base film including a first surface and a second surface opposite the first surface, and
    a plurality of projections on the base film, the plurality of projections to extend from the base film,
    wherein T1 represents a first thickness between the first surface and the second surface, T2 represents a second thickness between the first surface and the second surface, and T1 and T2 substantially satisfy the following equation: $0.1 \ \mu m \leq |T1-T2| \leq 10 \ \mu m$.

19. The apparatus of claim 18, wherein the apparatus comprises a backlight unit.

20. An apparatus comprising:
    a light source;
    an optical sheet to receive light from the light source, the optical sheet including:
    a reflective polarizing film;
    a base film on one surface of the reflective polarizing film, the base film including a first surface and a second surface opposite the first surface; and
    a plurality of projections on the base film, the plurality of projections to extend from the base film,
    wherein T1 represents a first thickness between the first surface and the second surface, T2 represents a second thickness between the first surface and the second surface, and T1 and T2 substantially satisfy the following equation: $0.1 \ \mu m \leq |T1-T2| \leq 10 \ \mu m$; and
    a liquid crystal display panel on the optical sheet.

21. The apparatus of claim 20, wherein the apparatus comprises a liquid crystal display.

* * * * *